March 20, 1951  W. O. GATES  2,545,547
DETECTION OF UNBALANCE IN ALTERNATING CURRENT LOADS
Filed Nov. 21, 1946
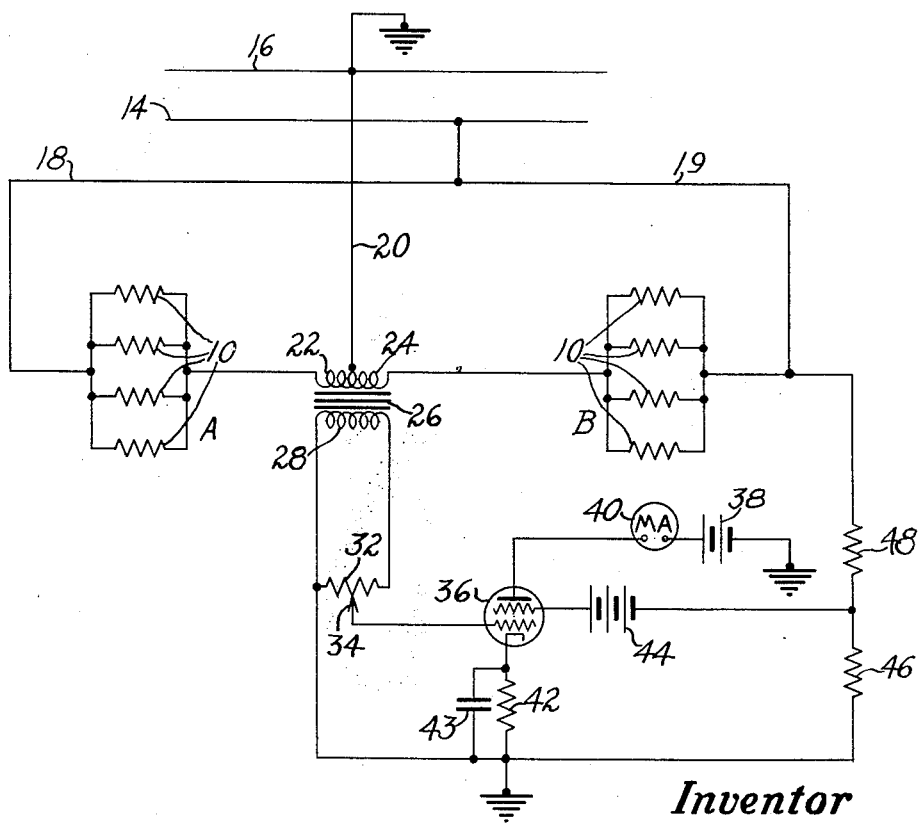
*Inventor*
William O. Gates
By His Attorney Patented Mar. 20, 1951

2,545,547

UNITED STATES PATENT OFFICE 2,545,547

DETECTION OF UNBALANCE IN ALTERNATING CURRENT LOADS

William O. Gates, Beverly, Mass., assignor to United Shoe Machinery Corporation, Flemington, N. J., a corporation of New Jersey Application November 21, 1946, Serial No. 711,455

1 Claim. (Cl. 177—311)

This invention relates to means for indicating an unbalance in the currents flowing in normally balanced alternating current circuits. While the invention has many other uses, it has been herein illustrated in connection with banks of infra-red lamps used for heating purposes.

There are many applications in industry and elsewhere involving the use of alternating current loads where it is desirable to indicate an electrical failure in the load and sometimes to indicate at least approximately the location of the part that has failed. Among the desirable characteristics of such an indicating means and method are low power consumption during the normal or balanced condition, adaptability for remote indication, economy of the indicating apparatus, reliability, and insensitivity to variations in line supply voltage affecting the load. The latter characteristic is especially desirable where an unexpected change in line voltage will cause a change in line current which is at least as great as the change occasioned by the failure of one element of a load comprising a plurality of such elements, and to differentiate between these two effects in a simple and reliable manner has been a problem heretofore.

One of the objects of the present invention is to provide an improved method of indicating a failure or disturbance in an alternating current load made up of many load units which will embody the foregoing desirable characteristics and will thus differentiate between a failure of this type and a current variation occasioned by a change in line voltage.

In accordance with the method of the invention the load circuit is divided into two sections, and the currents in the respective sections are used to create opposed magnetic fluxes in a common magnetic circuit which fluxes normally cancel, and the magnitude of the next flux is measured in order to determine the magnitude of unbalance in said load sections or the number of unit failures. In another aspect of the method the section in which the unbalance occurs is also indicated, from the phase of the net flux.

Another object of the invention is to provide apparatus for detecting and indicating an unbalance in normally balanced alternating current load circuits which will be economical and reliable and will be unaffected by variations in total load current caused by variations in line supply voltage. A further object of the invention is to provide apparatus of this character which is particularly adapted for remotely indicating such unbalance, and, if desired, of indicating at least approximately the location and extent of the failure.

With relation to these objects a further feature of the invention resides in the combination of an alternating current load circuit, such as a bank of infra-red lamps, which has been divided into balanced sections, a transformer having a pair of primary windings through which the respective total currents in said sections are passed to produce opposed magnetizing forces which normally cancel each other in the core of said transformer, and a secondary winding on said transformer with an indicating device connected thereacross which is responsive to secondary winding voltage. When the normal balance in load currents is changed the opposing magnetizing forces produced in the transformer no longer cancel each other and an indication is thus received. By another feature of the invention, both the magnitude and the direction of an unbalance are indicated by means of a circuit which is responsive to both the amplitude and the phase of the secondary voltage, thereby to indicate the extent of a failure in the load and its location, i. e., the section in which such failure has occurred.

The invention will now be more fully described with reference to the accompanying drawing, in which there is illustrated a circuit employing an indicator arranged for detecting both the direction and the amount of unbalance in the load sections.

In the drawing the load, comprised of a plurality of units 10, has been shown divided into two sections, A and B. The alternating current flows from supply mains 14 and 16 in one circuit through the lead 18, through load section A and through half 22 of the two halves 22 and 24 of the primary windings of a transformer 26, and in another circuit through lead 19, section B, and half 24 in phase opposition to the current in half 22 whereby the magnetic fields or fluxes set up by the primary windings oppose each other. If then the two load currents are equal, these fluxes cancel and no voltage is induced in the transformer secondary. However, if the current through one winding is greater than the current in the other, a secondary voltage will be induced whose value is substantially proportional to the current difference and whose phase relation to the supply current depends on the predominant current in the primary windings. Alternating voltage appearing across the secondary winding 28 of the transformer 26 is applied to a potentiometer 32 having a variable contact 34 connected to a first control grid of a space-discharge-tube amplifier 36. Plate voltage for the amplifier 36 is supplied from a source 38 through a current meter 40, and the amplifier is biased by means of a cathode resistor 42 and condenser 43. The amplifier 36 has a second control grid which is arranged for receiving the algebraic sum of a bias voltage and a reference alternating voltage, being connected to a source 44 of bias voltage and to an alternating voltage, shown as the drop across resistor 46 which, in series with resistor 48, is connected across the alternating current mains 14 and 16.

In the operation of the circuit the normal average flow of plate current in the amplifier 36, and hence the reading of the meter 40, is determined by the cathode bias on the first control grid and by the bias on the second control grid provided by the source 44 as modified by the effective average value of the alternating voltage derived from the resistance divider circuit 46, 48. When an unbalance occurs in the loads A and B, voltage appears across the secondary winding 28 of the transformer 26 and a portion of this thus reaches the first control grid of the amplifier 36 to increase or decrease the plate current and hence the indication of the meter 40. The average plate current will increase if the secondary winding voltage as applied to the first control grid is in phase with the voltage of the supply mains (i. e. or the reference voltage at the second control grid) and will decrease if the two voltages are out of phase, and this will depend upon which load section has had a unit failure. The amount of the increase or decrease will depend upon the extent of the failure and there will be a correlation between the location of a unit which has failed, i. e. whether in section A or section B, and the increase or decrease in the reading of the meter 40.

It is important in the invention that in these features, and in the method, variations in total load current such as might be caused by line voltage changes, are canceled in the opposing transformer primary windings and do not affect the indicating apparatus. Moreover, the energy lost to the indicating apparatus is negligible during the times when the load is balanced since no secondary winding current flows, and since the primary winding resistance losses may be made negligible and the magnetic core losses are effectively zero.

It will be appreciated that a plurality of load elements may be grouped not only in the illustrative manner specifically described herein but also, if desired, by pairing off individual load units and thus employing half as many indicator units as there are load units. In some cases it may be desired to employ an indicator circuit between two large balanced load sections, another between the respective halves of each section within that section, and so on. Such an arrangement is entirely feasible within the contemplation of the invention and may be preferred where the load units are of a type which are likely to fail readily such that two or more units might fail at one time. Moreover, it is not essential that the load sections be of equal size since a difference in their sizes may be compensated for, to secure the desired transformer balanced condition, by a proper selection of the number of turns in the respective primary windings through which the section load currents are to flow.

Having thus described my invention, what I claim as new and desire to secure by Letters Patent of the United States is:

In combination in an alternating current circuit including a plurality of load sections each comprising a plurality of parallel-connected units subject to open circuiting failure, transformer means having a core with primary windings connected respectively in series with said sections and so arranged that the algebraic sum of the magnetomotive forces generated by said windings in said transformer core is substantially zero when said load sections are operating normally, a secondary winding on said transformer, and indicator means connected to indicate the magnitude of the change in the secondary voltage caused by a change of current in one of said load sections.

WILLIAM O. GATES.

REFERENCES CITED

The following references are of record in the file of this patent:

UNITED STATES PATENTS

| Number | Name | Date |
|---|---|---|
| 707,150 | Moody | Aug. 19, 1902 |
| 1,973,520 | Belt | Sept. 11, 1934 |

OTHER REFERENCES

Pub.: "Die Glimmlampe als Stromanzeiger," Jeske, Helios 43 (1937), Nr. 24.